POLYMERIZATION OF ARYL AND ARALKYL ISOCYANATES

Paul R. Steyermark, Silver Spring, Md., assignor to W. R. Grace & Co., New York, N.Y., a corporation of Connecticut
No Drawing. Filed Aug. 24, 1966, Ser. No. 574,570
7 Claims. (Cl. 260—248)

This invention relates to polymerization of isocyanates and more particularly to a novel process for the production of isocyanurates.

It is known to polymerize isocyanates using various basic catalysts such as tertiary amines and alkali metal salts of carboxylic acids. These processes require relatively high temperatures of reaction before polymerization occurs. When polymerization has occurred in these processes, the product formation is stopped and the catalyst deactivated by the addition of an acid to the reaction mixture. Upon addition of this acid a salt usually forms in the reaction mixture which if allowed to remain can cause serious problems in the final isocyanurate product.

It is therefore an object of this invention to provide a novel process for polymerizing isocyanates which are devoid of the above disadvantages.

Another object of this invention is to provide a novel process for the polymerization of isocyanates without the formation of undesirable salts. Still another object of this invention is to provide a method for the polymerization of isocyanates without requiring the use of elevated temperatures. Still a further object of this invention is to provide a novel process for the polymerization of isocyanates whereby there is no need to deactivate the catalyst.

The foregoing objects and others which will become apparent from the following description are accomplished in accordance with this invention, generally speaking, by providing a process of polymerizing organic isocyanates which comprises carrying out the polymerization in the presence of at least a catalytic amount of a catalyst consisting of various xanthate salts. By the present invention the xanthate salts as hereinafter described catalyze even at room temperature and ambient conditions. The reaction may be carried out above about 0° centigrade either in any organic solvent which is inert to NCO groups or without solvent. The catalyst of our present invention may be described as:

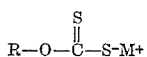

in which M+ is chosen from the group consisting of alkali metal ions such as lithium, sodium, and potassium; hydrazinium and tetra lower alkyl substituted hydrazinium ions; mono-, di-, tri-, or tetra- lower alkyl substituted ammonium ions, the lower alkyl meaning between 2 and 8 carbon atoms; and ammonium ions.

R is chosen from the group consisting of hydrocarbon alkyl radicals having between 2 and 16 carbon atoms;
O is oxygen; and
S is sulfur.

These ester salts are commonly known as xanthates, and may be prepared by many methods known in the art.

Any amount of catalyst can be used in the present process, however, generally not more than about 10% by weight (based on the amount of isocyanate) is added in the polymerization process. The catalyst is preferably employed in an amount of from about 1 to about 5% by weight (based on the amount of isocyanate) and is preferably added at a temperature of from about 0° C. to about 100° C. The reaction temperature may be from about 0° C. to about 100° C. or even higher although it is preferred to carry out the reaction at a temperature of from about 20° C. to about 70° C. The reaction stops when no more reactants remain in the system. The end point is easily recognized, since the reaction takes place so quickly that great turmoil is observed, and the system immediately becomes quiescent after reaction. The conversion can also be carried out in solution.

The isocyanates which are suitable in my invention can be represented as R—(NCO)$_x$ in which R is an aryl or aralkyl radical having at least 6 ring carbon atoms, and $x$ is 1, 2, or 3. By the term "aryl" is meant an aromatic hydrocarbon radical. By the term "aralkyl" is meant an aromatic hydrocarbon with (NCO) connected through an aliphatic side chain, and having optional aliphatic, halogen, nitro, alcohol, or alkoxy radicals substituted on the ring.

Any suitable aromatic or aralkyl mono-isocyanate can be trimerized by the presently defined process. Typical monoisocyanates are: phenyl isocyanate; benzyl isocyanate; p-tolyl isocyanate; 1-naphthyl isocyanate; m-propyl benzyl isocyanate; o-tolyl isocyanate; p-nitro phenyl isocyanate; p-phenylmethylene phenyl isocyanate; p-methoxy phenylisocyanate; o-chlorophenylisocyanate and others.

My catalyst can also be used to polymerize diisocyanate and triisocyanate compounds. The term "polymerize" is used since it is clear that the di- or tri-functional group could participate in the formation of two or three different isocyanurate rings at the same time, thus producing a crosslinked polymeric product having a very high melting point, and a broad molecular weight range. Typical compounds which can be used are m- and p-phenylene diisocyanates; 2,4-and 2,6-tolylene diisocyanates; 1,5-naphthylene diisocyanate; 4,4'-diphenylmethane diisocyanate; 3,3'-dimethyl-4,4'-biphenylene diisocyanate; 3,3' - dimethoxy-4,4'-biphenylene diisocyanate, 3,3'-diphenyl-4,4'-biphenylene diisocyanate, 4,4'-biphenylene diisocyanate, 3,3-dichloro-4,4'-biphenylene diisocyanate and triphenylmethane-4,4',4"-triisocyanate.

In addition to polymerization of isocyanate, my catalyst may profitably be used as a curing agent for the polyurethane-type prepolymers which have free NCO groups.

If a solvent is desired, it is possible to employ any organic solvent which does not react with isocyanate such as methylene chloride, chlorobenzene, dimethyl sulfoxide, acetonitrile, and ethyl acetate or the like. The solvent may be employed to form a 10–70 percent by weight solution of the isocyanate in the chosen solvent.

The triaryl and triaralkyl isocyanurates produced by the process of this invention are quite stable thermally and can be heated well beyond their melting points without decomposition. Those containing reactive substituents on the aryl rings are of particular value in the preparation of trifunctional compounds which can be used in producing condensation polymers in which cross-linking is desired, such as in the manufacture of the polyurethane type of elastomers. The nitro group contained in the aryl rings can be readily reduced to the amines, and these triamines having good thermal stability are very suitable for further condensation in the preparation of polyurethane type isocyanate resins, including elastomers, since they give a cross-linking as well as a chain-extending effect which is very desirable, particularly in the preparation of elastomers. These triamines are also suitable as curing agents for the ethoxyline resins (epoxy resins). The triamino compounds can be converted by phosgenation to the triisocyanates which, as disclosed in current literature, are useful in the preparation of high molecular weight polymers.

The alkyl substituted triaryl isocyanurates can be readily oxidized to the tricarboxylic acids which are useful in condensation polymerization to form polyester resins, particularly where cross-linking is desired. The unsubstituted triaryl isocyanurates can be readily halogenated and the resulting halogen compounds serve as intermediates in the preparation of amines or other substitution derivatives.

The polymeric isocyanurates are valuable intermediates for various condensation polymers and may be used in well-known manners together with high molecular weight polyhydroxyl compounds such as polyesters, polyvinyl formals and the like for lacquer compositions. The products themselves are useful binding agents.

The invention is further illustrated by the following examples in which parts are by weight unless otherwise specified.

Example 1

About 3.16 grams of phenyl isocyanate was mixed with 42 milligrams of tetraethylammonium ethyl xanthate to form about a 1.3% by weight concentration of catalyst. This mixture was stirred for 2 minutes at 50–55° centigrade. An energetic reaction took place and the material solidified. The product was triturated with ether, filtered and washed with ether. The material was recrystallized from acetone and ether and melted at 278° C. and gave correct analytical results for triphenyl isocyanurate. The dry material weighed 2.73 grams giving an 86% by weight yield.

Example 2

A mixture of p-tolylisocyanate and tetraethylammonium ethyl xanthate was trimerized by heating for a few minutes at 50–55° C. Catalyst concentration was 2% by weight. The yield of tri-4-tolyl isocyanurate was 76%.

Example 3

Tri-(1-naphthyl)isocyanurate was similarly prepared as in the above examples in a 78% yield by heating for a few minutes a mixture of the isocyanate with 5% by weight of catalyst used in Example 2 at 60–65° C. After recrystallization from dimethyl sulfoxide/acetone/ether, the material melted at 325° C. The results of this example were particularly striking in view of a reference stating that tri-(1-naphthyl) isocyanurate can only be prepared from the isocyanate using an organotin compound as catalyst [Bloodworth et al., Chem. Communications, 1965 (2), 24].

Examples 4, 5, 6, 7

Using the reaction conditions of Example 2, the following isocyanurates were produced, using the reactants described in Table I.

TABLE I

| Ex. | Isocyanate | Catalyst | Catalyst concentration, percent | Percent yield of isocyanurate |
|---|---|---|---|---|
| 4 | Benzyl isocyanate | Tetra-methyl-ammonium ethyl xanthate. | 4.5 | 82 |
| 5 | o-Tolyl isocyanate | Potassium iso-butyl xanthate. | 3 | 76 |
| 6 | p-Nitrophenyl isocyanate. | Tri-methyl hydrazinium ethyl xanthate. | 4 | 95 |
| 7 | o-Chlorophenyl isocyanate. | Sodium n-hexyl xanthate. | 6 | 78 |

Examples 8, 9

The following isocyanates were trimerized in a 50% dimethyl sulfoxide solution. The procedure was: The isocyanate was dissolved in the dimethyl sulfoxide to form a 50% by weight solution. Then the chosen amount of xanthate catalyst was added, and the solution stirred at about 40–45° C. for 2 minutes. A vigorous reaction took place almost immediately, and either the solution solidified or the trimer precipitated from the solution. The product was recrystallized from acetone and ether. Data is given in Table II.

TABLE II

| Examlpe | Isocyanate | Catalyst | Catalyst Concentration, Percent | Percent Yield |
|---|---|---|---|---|
| 8 | Phenyl isocyanate | Potassium ethyl xanthate. | 2 | 89 |
| 9 | p-Tolyl isocyanate | do | 2 | 78 |

Example 10

A mixture of phenyl isocyanate and p-tolyl isocyanate in a 2:1 mole ratio was dissolved in dimethyl sulfoxide to form a 60% by weight solution, and tetraethylammonium ethyl xanthate added in about 4 weight percent, based on the isocyanates. The mixture was stirred at about 45° C. for 3 minutes. A crystalline product was isolated and analysis showed that four products were present: triphenyl isocyanurate and diphenyl-(4-tolyl) isocyanurate in major amount, and tri-(-4-tolyl) isocyanurate and di-(4-tolyl) phenylisocyanurate in minor amount.

Example 11

Approximately equal molar amounts of phenyl isocyanate, p-tolyl isocyanate, and p-nitrophenyl isocyanate were dissolved in dimethyl sulfoxide to form a 60% by weight solution, and 6 weight percent of sodium ethyl xanthate was added. After a reaction lasting about 4 minutes, a crystalline product was recovered. This product was a mixture of isocyanurates: triphenyl isocyanurate; tri-(-4-tolyl) isocyanurate; tri-(-p-nitrophenyl) isocyanurate; phenyl-(4 - tolyl)-(p - nitrophenyl) isocyanurate; diphenyl (p - nitrophenyl) isocyanurate; diphenyl-(-4-tolyl) isocyanurate; di(-4-tolyl) phenyl isocyanurate; di-(-4-tolyl)-p-nitrophenyl isocyanurate; di-(p-nitrophenyl) phenyl isocyanurate; and di-(p-nitrophenyl)-(-4-tolyl) isocyanurate.

Example 12

About 3.5 grams of 2,4-toluene diisocyanate was mixed with 42 milligrams of tetraethylammonium ethyl xanthate, stirred for 3 minutes at 50° C. After a vigorous reaction, a white crystalline material was isolated. This material had a softening point of about 200° C., indicating a polymeric material with a high molecular weight range. Analysis indicated that the product was a highly cross-linked poly-tolyl isocyanurate.

Although the invention has been described in considerable detail in the foregoing, it is to be understood that such detail is solely for the purpose of illustration and that many variations can be made by those skilled in the art without departing from the spirit and the scope of the invention except as set forth in the claims.

I claim:

1. In the method of preparing a polymeric product from a feed comprising at least one isocyanate of the formula $$R(NCO)_x$$

in which R is chosen from the group consisting of aryl and aralkyl radicals having at least 6 ring carbon atoms; and $x$ is 1–3 thereby to form a solid polymer, and recovering said solid polymer the improvement comprising contacting the said feed with a xanthate catalyst.

2. The method according to claim 1 in which the isocyanate is a mono-isocyanate and the resulting polymer is

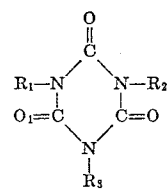

and in which $R_1$, $R_2$, and $R_3$ are each independently selected from the group consisting of aryl and aralkyl radicals.

3. The method according to claim 1 in which the isocyanate is 2,4-toluene diisocyanate and the resulting polymer is a white crystalline material with a softening point of about 200° C.

4. The method according to claim 1 in which the xanthate catalyst is

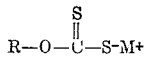

in which M+ is chosen from the group consisting of alkali metal ions such as lithium, sodium, and potassium; hydrazinium and tetra-lower alkyl substituted hydrazinium ions, ammonium and mono-, di-, tri-, and tetra- lower-alkyl substituted ammonium ions; lower alkyl in all cases having between 2 and 8 carbon atoms; and R is chosen from the group consisting of alkyl hydrocarbon radicals having between 2 and 16 carbon atoms; O is oxygen; and S is sulfur.

5. The method according to claim 4 wherein about 1 to about 10% by weight of said catalyst is used, based on the total amount of isocyanate present.

6. The method according to claim 5 wherein the polymerization is carried out at a temperature of from about 0° centigrade to about 100° centigrade.

7. The method according to claim 5 wherein the polymerization is carried out in the presence of an organic solvent, said solvent being selected from the group consisting of methylene chloride, chlorobenzene ethyl acetate, dimethyl sulfoxide, acetonitrile and mixtures thereof.

References Cited
UNITED STATES PATENTS 3,330,828   7/1967   Grogler et al. _____ 260—248

JOHN D. RANDOLPH, *Primary Examiner.*

J. M. FORD, *Assistant Examiner.*